US 8,215,229 B2

(12) United States Patent
Faccinti (10) Patent No.: US 8,215,229 B2
(45) Date of Patent: Jul. 10, 2012

(54) MACHINE FOR THE PREPARATION OF COFFEE AND THE LIKE

(75) Inventor: Alfredo Faccinti, Leini' (IT)

(73) Assignee: CME di Faccinti A., Turin (IT)

( * ) Notice: Subject to any disclaimer, the term of this patent is extended or adjusted under 35 U.S.C. 154(b) by 483 days.

(21) Appl. No.: 12/376,683

(22) PCT Filed: Aug. 3, 2007

(86) PCT No.: PCT/IB2007/053064
§ 371 (c)(1),
(2), (4) Date: Feb. 6, 2009

(87) PCT Pub. No.: WO2008/017995
PCT Pub. Date: Feb. 14, 2008

(65) Prior Publication Data
US 2010/0005971 A1    Jan. 14, 2010

(30) Foreign Application Priority Data
Aug. 8, 2006    (EP) ..................................... 06425577

(51) Int. Cl.
*A47J 31/40*    (2006.01)
(52) U.S. Cl. ................ 99/280; 99/281; 99/282; 99/283; 99/289 R; 99/302 R
(58) Field of Classification Search ................ 99/302 R, 99/280–283, 289 R
See application file for complete search history.

(56) References Cited

U.S. PATENT DOCUMENTS

| 2,786,408 | A | * | 3/1957 | Herrera | 99/283 |
| 4,178,842 | A | * | 12/1979 | Vitous | 99/281 |
| 6,779,435 | B1 | * | 8/2004 | Iacobucci | 99/302 R |
| 7,401,545 | B2 | * | 7/2008 | Hu et al. | 99/281 |
| 2007/0259085 | A1 | * | 11/2007 | Kodden et al. | 426/433 |
| 2008/0190298 | A1 | * | 8/2008 | Morgandi | 99/282 |
| 2009/0258114 | A1 | * | 10/2009 | Lassota et al. | 426/78 |
| 2010/0162897 | A1 | * | 7/2010 | Ozanne et al. | 99/280 |
| 2010/0282088 | A1 | * | 11/2010 | Deuber et al. | 99/281 |

FOREIGN PATENT DOCUMENTS

| EP | 0 465 877 A1 | 1/1992 |
| IT | 1 232 113 B | 1/1992 |
| WO | 00/07486 A2 | 2/2000 |

* cited by examiner

*Primary Examiner* — Sebastiano Passaniti
(74) *Attorney, Agent, or Firm* — Sughrue Mion, PLLC (57) ABSTRACT

A machine for preparing coffee or the like. The machine includes a pump supplying water; a unit for preparing and dispensing of coffee, with a dispensing seating, and an upstream electric heater for heating the water passing through the heater; a hydraulic circuit which connects the pump to the inlet of the heater and which includes solenoid valves assuming a rest configuration in which the heater is substantially emptied of water, and a working configuration in which the heater is enabled to receive and be traversed by a flow of water sent by the pumping devices for the preparation of the coffee; and a control unit (ECU) arranged for activating the heater and causing the solenoid valves to change to the working configuration only when a command is issued for the preparation and dispensing of coffee.

10 Claims, 6 Drawing Sheets

MACHINE FOR THE PREPARATION OF COFFEE AND THE LIKE

BACKGROUND OF THE INVENTION

The present invention relates to a machine for the preparation of coffee and the like, and in particular a machine of the type termed professional, for use in bars and the like.

Conventional machines for the preparation of coffee typically comprise a hydraulic pump for supplying a flow of water coming from the mains water system, a boiler provided with a pressure switch and having a capacity which may amount to 10 liters or more, and at least one unit for the preparation and dispensing of the coffee, having at least one seating to which an associated filter-holder can be coupled. The internal volume of the boiler is predominantly occupied by water and, for the remainder, by steam. By means of an electrical resistance of the armoured type, the water and the steam in the boiler are maintained at a high temperature, of the order of 130° C. for example. The preparation and dispensing units receive hot water from the boiler and the level of the water in the boiler is controlled by means of a probe. A control unit operates the supply pump according to the signal supplied by the probe, so as to keep the amount of water in the boiler substantially constant.

In such conventional machines, at least one lance is generally provided for the emission of hot steam, and controlled by means of a suitable tap. The steam is drawn from the upper part of the region internal to the boiler.

In conventional machines it is further possible to dispense hot water, for example for the preparation of infusions and the like, by means of a pipe which is immersed in the boiler and which is controlled by a suitable tap.

In order to limit the formation of limescale in the hydraulic circuits and in the various components of the machine, it is necessary to provide a de-scaler and a softener.

In such conventional machines, the boiler represents the "heart" of the machine and any breakdown thereof generally results in the entire machine being inoperable.

The large mass of water which is maintained at constant temperature in the boiler entails a high consumption of electric power.

Moreover, on resuming operation after a period of interruption, such machines take a long time (of the order of several hours) to reach the thermal operating state. For this reason, a number of users leave such machines permanently switched on, which contributes to an increase in the consumption of electric power. If, on the other hand, the machine is switched off, for example at the end of the day, on resuming activity it is necessary to dispense and throw away a certain number of coffees before the quality of the prepared coffee reaches an acceptable level. In effect, the stagnation of the water in the boiler and in the pipes of the associated hydraulic circuits often entails the development of unpleasant tastes and/or odours in the first coffees dispensed on resuming activity.

Also known for the preparation of coffee are machines comprising a single boiler for each coffee preparation and dispensing unit, and a further boiler for keeping available heated water and steam which are dispensed on demand.

This solution makes it possible to modify the coffee preparation and dispensing capacity of the machine over time, according to need. Moreover, if the boiler associated with a specific coffee preparation and dispensing unit breaks down, it is possible to exclude that unit, while the rest of the units still remain operational.

However, the electrical consumption remains high, since the various accumulators associated with the individual units and the additional accumulator or boiler are in any case permanently heated.

In addition, this type of machine has a decidedly complex architecture and is particularly expensive to produce.

In the light of the above, it is an aim of the present invention to produce an improved machine for the preparation and dispensing of coffee, which machine makes it possible to remedy the drawbacks and limitations described above of the machines according to the prior art.

SUMMARY OF THE INVENTION

These and other aims are achieved according to the invention with a machine comprising
- a hydraulic pump for the controlled supply of a flow of water,
- at least one unit for the preparation and dispensing of the coffee, with at least one seating to which an associated filter-holder can be coupled; the unit comprising
- an electric heater located upstream of said seating and suitable for heating up to a predetermined temperature a flow of water passing through the heater;

the machine further comprising
- a hydraulic circuit which connects the delivery side of the pump to the inlet of said heater and which comprises solenoid valve means capable of assuming a rest configuration in which said heater is substantially emptied of water, and a working configuration in which the heater is enabled to receive and be traversed by a flow of water sent by the pump for the preparation of the coffee, and
- control means arranged to activate the heater and to cause said solenoid valve means to change to the working configuration only when a command is issued for the preparation and dispensing of coffee.

Owing to the characteristics defined above, the machine according to the present invention is devoid of systems for accumulating and maintaining heated water, and requires for its operation an extremely limited amount of electric power.

The absence of stagnation of water in the machine avoids the development of the drawbacks which may derive therefrom, such as unpleasant tastes and odours of the coffee prepared after an interruption in the operation of the machine.

On resuming operation after an interruption, the machine according to the invention is capable of reaching the optimum thermal operating state in an extremely rapid manner, of the order of a few minutes.

BRIEF DESCRIPTION OF THE DRAWINGS

Further characteristics and advantages of the invention will become clear from the following detailed description, provided solely by way of non-limiting example, with reference to the appended drawings, in which.

DETAILED DESCRIPTION OF THE INVENTION

Figure 1:
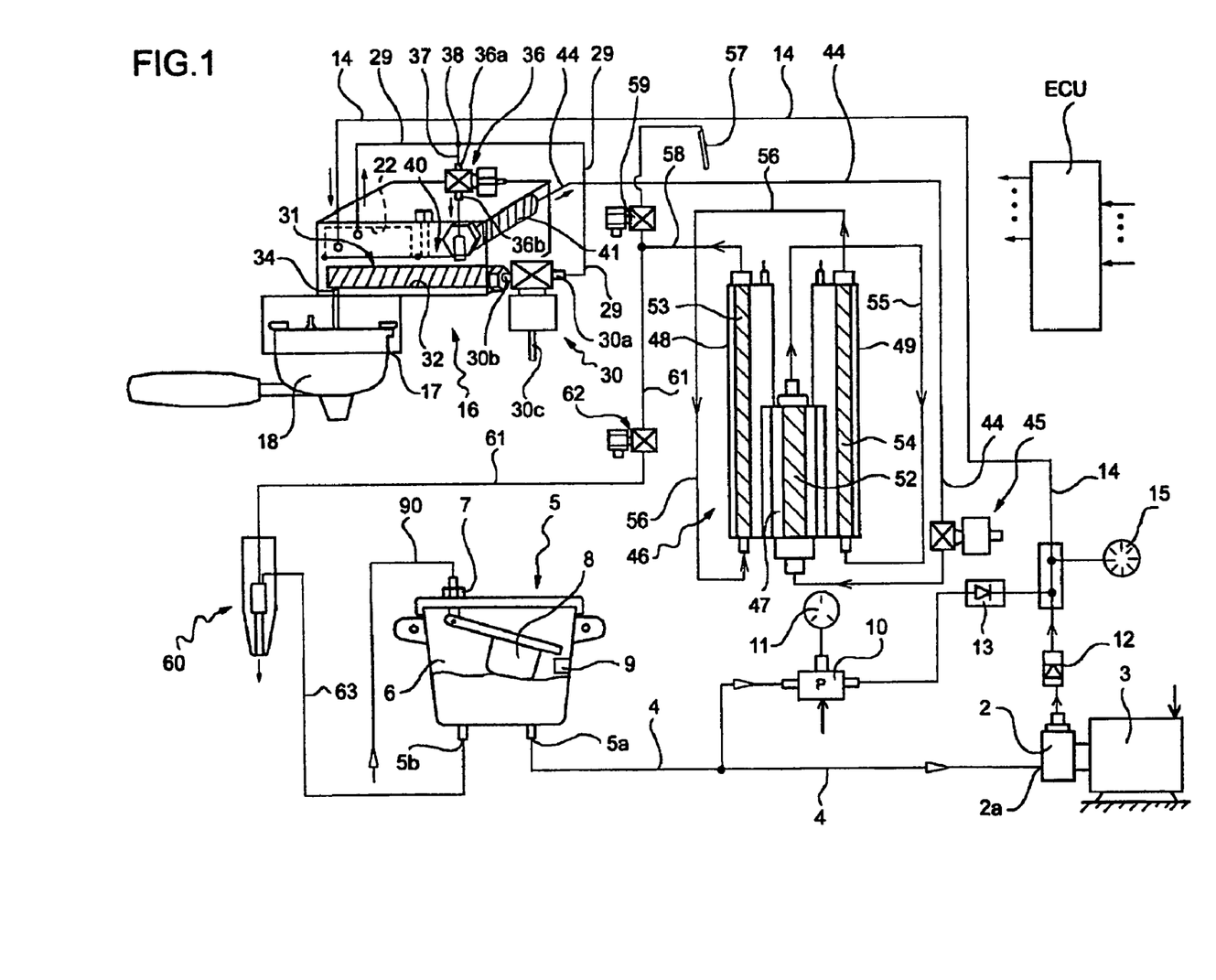
FIG. 1 is a diagrammatic view of a machine for the preparation of coffee according to the present invention.

In FIG. 1, a machine 1 for the preparation of coffee according to the present invention comprises a main hydraulic pump 2 driven by an electric motor 3. The pump 2 has an inlet 2a connected by means of piping 4 to a first outlet 5a of a water reservoir 5. The reservoir comprises a container in the form of a tank 6 and has at the top an inlet tap 7 controlled by a float 8. The tap 7 is connected to the mains water supply via an inlet pipe 90.

An electrical switch 9 is associated with the float 8 in such a way that when the water level in the container 6 falls to a predetermined minimum level, the switch 9 delivers a signal, for example to an ECU electronic control unit of the machine 1, which then acts to prevent the operation of the motorised pump 2, 3. This makes it possible to avoid any damage to the motorised pump 2, 3 which might occur if the latter had to operate in cavitation conditions.

There may also be associated with the float 8 a further switch capable of switching when the water level in the tank 6 exceeds a predetermined maximum level.

Preferably, although not necessarily, the machine 1 further comprises an additional hydraulic pump 10, having a power noticeably below that of the motorised pump 2, 3. The additional pump 10 is, for example, a vibratory pump, with which an electrical voltage regulator 11 is associated.

The additional pump 10 has the intake side connected to the pipe 4 at a point between the reservoir 5 and the motorised pump 2, 3.

The outlets or delivery sides of the pumps 2 and 10 are connected, via respective non-return valves 12 and 13, to a pipe 14 to which a pressure measuring device or manometer 15 is coupled.

Figure 2:
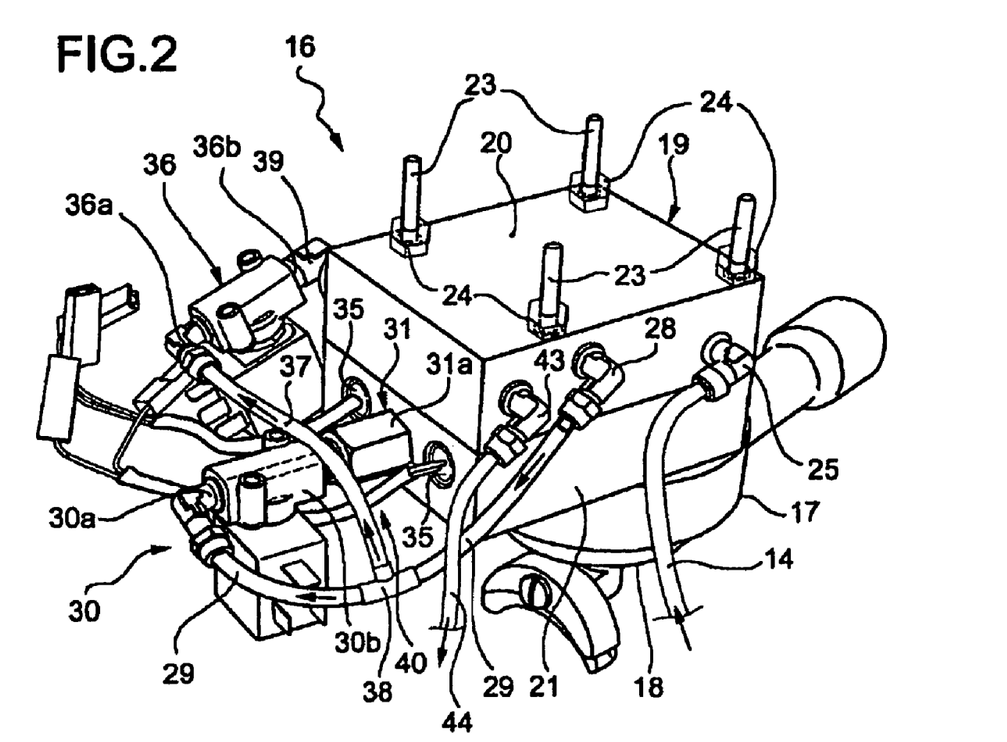
FIG. 2 is a perspective view of a unit for the preparation and dispensing of the coffee, of a machine according to the present invention.
Figure 4:
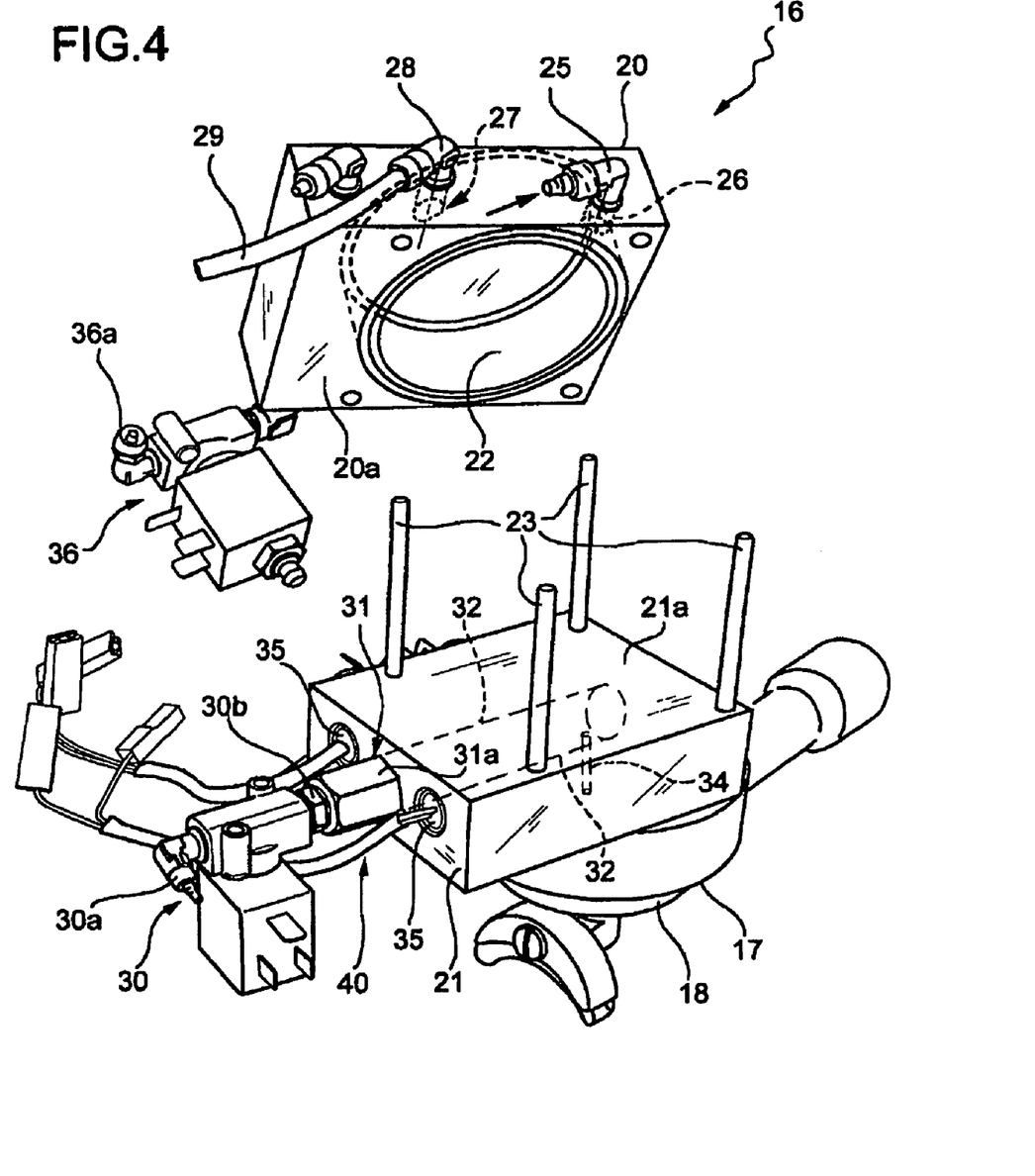
FIG. 4 is a partially exploded perspective view of the unit for the preparation and dispensing of coffee shown in FIG. 2.

The pipe 14 reaches a unit for the preparation and dispensing of the coffee, indicated as a whole by 16 in FIGS. 1, 2 and 4. The unit, in a manner which is known per se, has at the bottom a seating 17 to which can be coupled an associated filter-holder 18 capable of dispensing coffee into one or more cups (not illustrated) standing underneath.

With reference in particular to FIGS. 2 and 4, in the exemplary embodiment illustrated therein the unit 16 comprises a structure 19 made of a material which is a good conductor of heat, in particular metallic material which is conveniently produced with two bodies 20, 21 clamped to each other in a superposed arrangement.

In the exemplary embodiment illustrated, the bodies 20 and 21 are substantially in the shape of a parallelepiped.

The upper body 20, in its lower major face 20a, turned towards the underlying body 21, has a cylindrical recess 22 (FIG. 4). When the bodies 20 and 21 are clamped in a sealed manner to each other, as shown in FIG. 2, for example by means of a plurality of threaded rods 23 and associated nuts 24, the recess 22 of the body 20 together with the upper major face 21a of the body 21 defines a cylindrical chamber. The chamber, the functions of which will be described hereinafter, has a capacity or volume equal, for example, to two cups of coffee. It communicates with the piping 14 (FIGS. 1 and 2) via an inlet connector indicated by 25 in FIGS. 2 and 4 and a passage provided in the upper body 20 and indicated by 26 in FIGS. 4 and 5.

Through a further passage 27, and an associated connector 28 (FIGS. 2, 4 and 5), the recess or chamber 22 communicates with the inlet 30a of a solenoid valve 30. The latter has an outlet 30b coupled to the inlet of a member 31 which will now be described in more detail with particular reference to FIG. 3.

Figure 3:
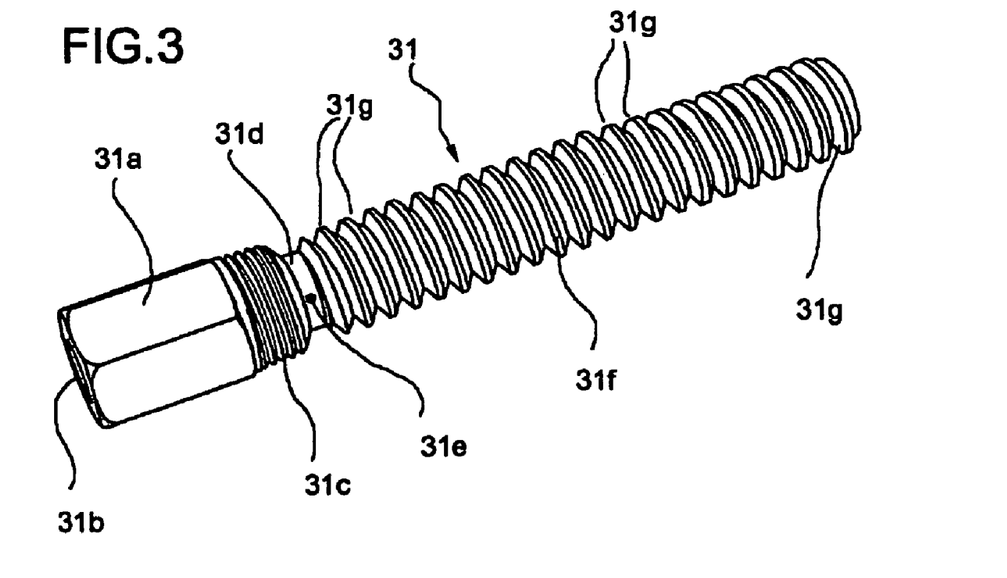
FIG. 3 is a perspective view of a component of the unit shown in FIG. 2.

The member 31 is basically a rod of machined metallic material, having at one end a polygonal head 31a which is provided with an axial hole or passage 31b coupled to the outlet 30b of the solenoid valve 30.

Adjacent to the polygonal head 31a, the member 31 has a threaded portion 31c, which is followed by an axial portion 31d of reduced diameter, in which at least one radial passage 31e is provided which communicates with the axial passage 31b. The latter ends substantially at the portion 31d of the member 31, where it connects with the radial passage 31e.

The portion 31d of the member 31 is followed by a further longitudinal portion 31f, having a diameter larger than that of the portion 31d and slightly smaller than the diameter of the threaded portion 31c.

The portion 31f also has a thread-like configuration, which defines a helical track or passage 31g.

With reference to FIG. 4, the member 31 is inserted into a substantially cylindrical passage 32 arranged in the lower body 21 of the unit 16. The member 31 is in particular screwed into the body 21, by means of its threaded portion 31c.

The arrangement is such that the terminal axial passage 31b of the member 31, via the radial passage 31e, is placed in communication with a spiral passage which is defined between the helical track 31g of the portion 31f of that member and the cylindrical wall of the passage 32 arranged in the body 21.

The opposite end of the passage 32 from the solenoid valve 30 is blind, and via a radial passage indicated by 34 in FIG. 4 is capable of communicating with the seating 17 to which the filter-holder 18 is coupled.

In the lower body 21 of the unit 16, parallel to the sides of the passage 32, heating resistors indicated by 35 in FIGS. 2 and 4 are inserted into respective seats.

In the assembly, the lower body 21, the member 31 and the associated resistors 35 form a heating device, indicated as a whole by 40 in FIGS. 1, 2 and 4, and capable of heating, as will be seen more clearly in the following, a flow of water passing through it with a view to the preparation and dispensing of coffee via the unit 16 and the associated filter-holder 18.

The solenoid valve 30 further has a discharge outlet, not visible in FIGS. 2 and 4, but shown and indicated by 30c in FIG. 1. The solenoid valve is capable of assuming a rest configuration in which it intercepts communication between the piping 29 and the inlet passage 31b of the member 31 of the heating device 40. In that configuration, the solenoid valve 30 couples the piping 29 and the heater 40 to the discharge opening 30c.

The solenoid valve 30 is capable of switching to a working configuration in which the heating device 40 is enabled to receive and be traversed by a flow of water coming from the pump 2 via the pipe 14 and the chamber 22 of the unit 16, for the preparation and dispensing of coffee at the unit 16. In that configuration, instead, communication between the pipe 29 and the discharge outlet 30c of said solenoid valve is intercepted.

With reference to FIGS. 1, 2 and 4, a further solenoid valve 36 is connected to the upper body 20 of the unit 16. The solenoid valve has an inlet 36a connected to an intermediate portion of the piping 29 via a length of piping 37 and a T-junction 38 (FIG. 2).

Figure 5:
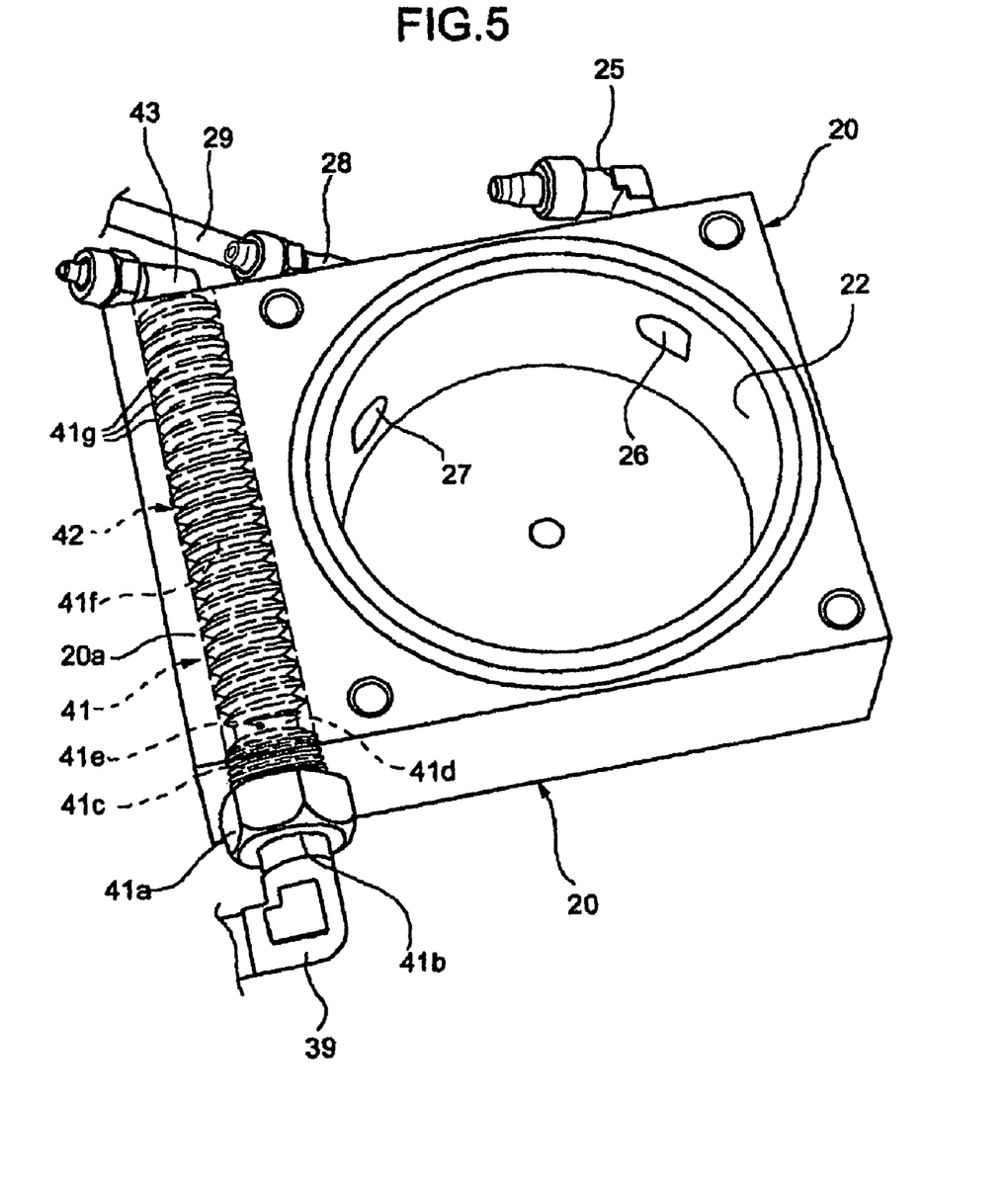
FIG. 5 is a perspective view of part of the unit shown in FIGS. 2 and 4.

The solenoid valve 36 has an outlet 36b which communicates via a connector 39 with the inlet passage of a member 41 (FIG. 5) similar to the member 31 described previously with reference to FIG. 3, fixed in a passage 42 arranged in the upper body 20 of the unit 16. In FIG. 5, the elements 41a-41g of the member 41 correspond substantially to the elements 31a-31g of the member 31 described previously. The passage 42 of the body 20, at the opposite end from the solenoid valve 36, communicates with a connector 43 and, via the latter, with piping indicated by 44 in FIGS. 1 and 2.

Figure 6:
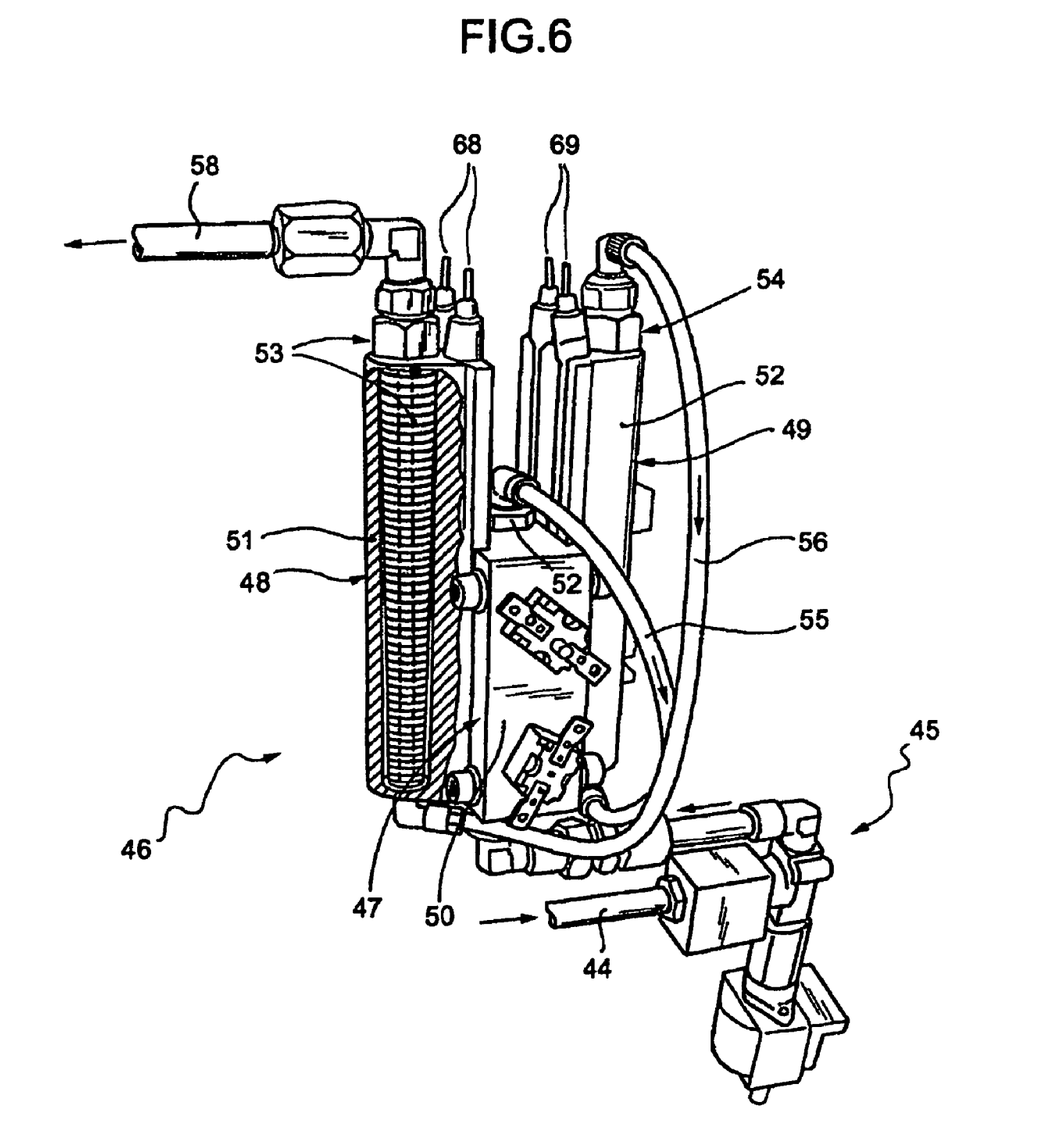
FIG. 6 is a partially sectional perspective view of a unit for the generation of steam usable in a machine according to the present invention.

With reference to FIGS. 1 and 6, the piping 44 reaches a further solenoid valve indicated by 45 which controls communication between the piping 44 and a unit for generating hot steam, indicated as a whole by 46 (FIGS. 1 and 6).

The unit 46 in the exemplary embodiment illustrated comprises three heating units or modules, indicated by 47, 48 and 49.

The module 47 is clamped between the adjacent modules 48 and 49, which are identical to each other.

Each of the modules 47, 48 and 49 comprises a respective body 50, 51, 52 in which a respective longitudinal, substantially cylindrical passage is provided. In FIG. 6, only the longitudinal passage 51a provided in the body 51 is visible.

In the longitudinal passages of the modules 47, 48 and 49 respective shaped members 52, 53 and 54 are arranged, similar to the member 31 illustrated in FIG. 3, or the member 42 in FIG. 5.

The lateral modules 48 and 49 are further provided with respective heating resistors 68 and 69, which extend along the associated members 53 and 54.

With reference to FIGS. 1 and 6, the outlet of the solenoid valve 45 is connected to the inlet of the heating unit 47, which is located in the lower part of the unit or module. The outlet of the heating module 47 is connected to the inlet of the adjacent module 49 via flexible tubing 55.

The outlet of the module 49 is in turn connected to the inlet of the heating module 48, via further flexible tubing 56.

Finally, the outlet of the heating module 48 is capable of being placed in communication with a lance 57 for the emission of steam, via piping 58 and a solenoid valve 59.

The outlet of the heating unit 46 is further able to be coupled to a device for the dispensing of hot water 60, via piping 61 on which a further solenoid valve 62 is interposed (FIG. 1).

For the dispensing of hot water, the dispensing device 60 receives from the heating unit 46 a flow of steam at high temperature. Said dispensing device is produced in such a way that, by the Venturi effect, the flow of steam occurring is capable of drawing a flow of water from the reservoir 5, through piping 63 which is connected to a second outlet 5b of said reservoir. The flow of steam coming from the unit 46, besides inducing the return of a flow of water from the reservoir 5, heats it, bringing it to an operating temperature of 80° C. for example.

The machine 1 described above operates substantially in the following manner.

At rest, or when the machine 1 is not to dispense either coffee or steam or hot water, the unit or units 16, the heating unit 46, and also all the hydraulic circuitry are substantially emptied of water. Owing to this characteristic, the unpleasant drawbacks are avoided such as the development of bad tastes and/or odours, which typically are found in machines according to the prior art in which hot water accumulators or boilers are used instead.

For the preparation of a coffee, the command issued by the user reaches the ECU unit, which activates the motorised pump 2, 3 and sets the solenoid valve 30 in the state in which it permits the passage of water from the piping 29 to the heater 40. The solenoid valve 36, however, is maintained in the state in which it impedes the flow of water from the piping 29 to the heater 41.

In that state, the motorised pump 2, 3 sends a flow of water to the heater 40, via the piping 14, the chamber 22, the piping 29 and the solenoid valve 30. In the chamber 22 the flow of water is pre-heated inasmuch as the chamber benefits by conduction from the heating action of the heater 40. The pre-heating of the flow of water in the chamber 22 is capable of precipitating at least the greater part of the limescale transported by the water, so that the machine can also operate without accessory water softening devices.

In the transit through the heater 40, the flow of water is brought to the proper temperature for the preparation (infusion) of coffee which is dispensed via the filter-holder 18 into a container standing underneath, such as a cup or the like.

When the coffee has been dispensed in the amount desired by the user, the latter deactivates dispensing, and the ECU control unit in turn deactivates the motorised pump 2, 3 and switches the solenoid valve 30 back to the rest state, in which it disconnects the piping 29 from the heater 40, and in which it reconnects the piping and the heater 40 to the atmosphere. In this way, any residues of water contained in the piping or in the heater can be eliminated, avoiding stagnation.

When the user requires the dispensing of hot steam, an appropriate command issued to the ECU unit causes the latter to activate the vibratory pump 10, which sends a flow of water towards the chamber 22 of the unit 16, via the piping 14. The ECU unit further effects the switching of the solenoid valve 36 (and of the solenoid valve 45), bringing it into the configuration in which it places the piping 29 in communication with the heater 41. Thus, the flow of water sent by the pump 10 is pre-heated in the chamber 22 and then further heated in the passage along the member 41. The flow of water then proceeds via the piping 44 to the heating unit 46. In that unit the water is further heated in the inlet unit or module 47, and then is further heated in the second module 49, where it turns at least partially into steam. The passage through the further module 46 brings about the complete vaporisation of the flow, and the raising of its temperature to the desired value.

Via the solenoid valve 59, duly switched by the ECU unit, the flow of steam can then be dispensed via the lance 57.

When the user commands the cessation of the dispensing of steam, the ECU unit deactivates the pump 10 and switches the solenoid valves 36, 45 and 59 back to the rest state, in which the entire circuit is again in communication with the surrounding atmosphere, for the purpose of avoiding stagnation of water.

For the dispensing of hot water, the ECU unit controls the pump 10 and the solenoid valves 36, 45 and 62 in such a way as to bring about a flow of water which, via the piping 14, reaches the chamber 22, whence it proceeds via the solenoid valve 36 and the heater 41, and via the piping 44 reaches the unit 46. At the outlet of that unit (piping 58) there is therefore hot steam which is rerouted towards the device for dispensing hot water 60 via the solenoid valve 62 duly controlled by the ECU unit. In this state, the solenoid valve 59 is maintained in the state in which it impedes communication between the unit 46 and the lance 57.

The flow of steam which reaches the dispensing device 60, as already described previously, induces by the Venturi effect a return of water from the reservoir 5 via the piping 63. The water thus returned is heated by the steam, and can be dispensed into a container standing beneath.

In this case also, when the user commands the cessation of dispensing, the ECU unit resets all the devices in the rest state in which the entire hydraulic circuit of the machine is in communication with the atmosphere and there is no stagnation of water.

Figure 7:
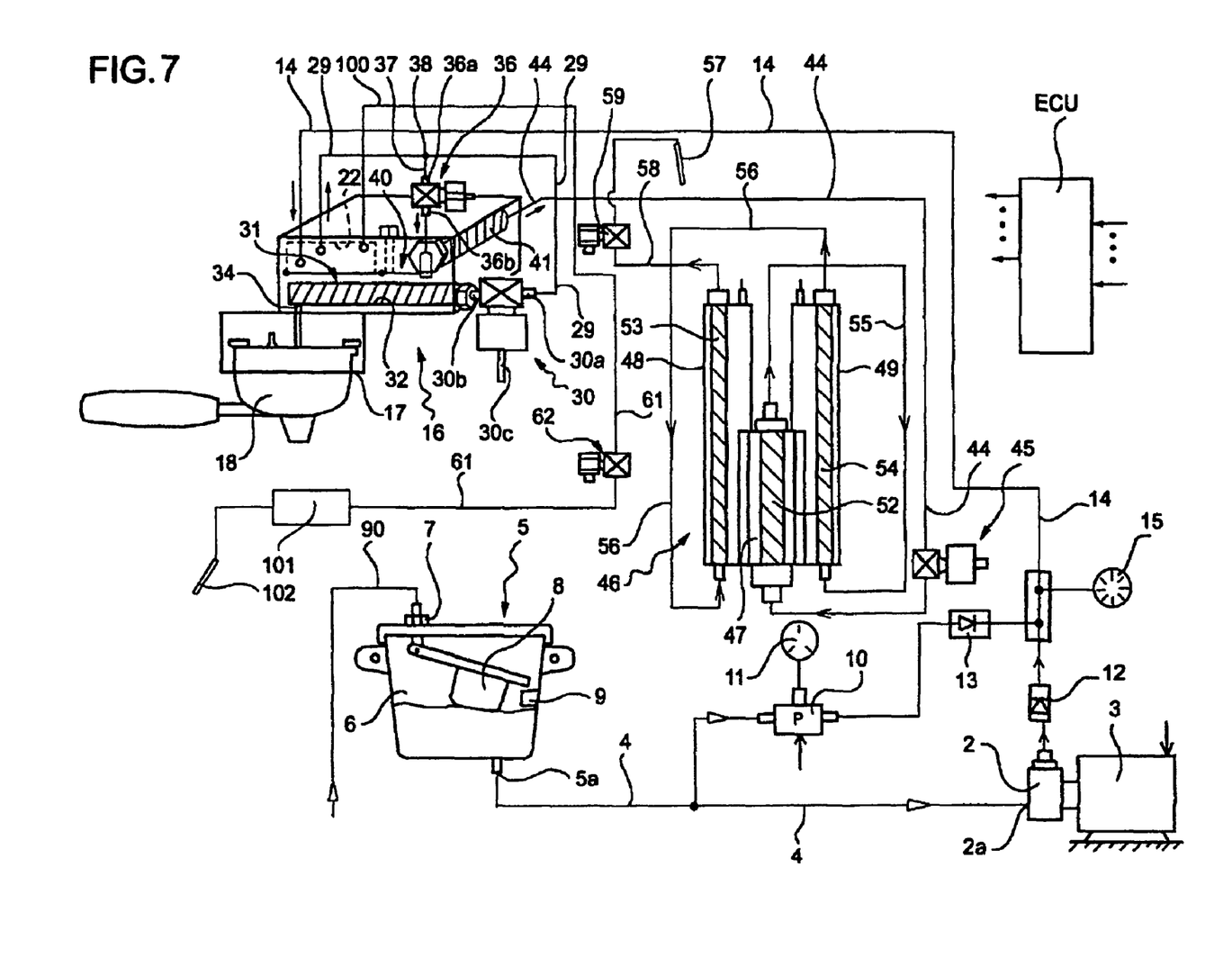
FIG. 7 is a diagrammatic view of another embodiment of a machine according to the invention.

In FIG. 7 there is diagrammatically shown a variant of embodiment. In said Figure, parts and components which had already been described have been attributed the same reference numerals previously used.

In the embodiment according to FIG. 7 the inlet side of solenoid valve 62 is uncoupled from the heating unit 46, and is coupled instead to the chamber 22 of the heating unit 16. The outlet side of solenoid valve 62 is connected to a hot water dispenser 102 through a heat exchanger or heating module 101 which can be constructionally such as one of the modules of the heating unit 46. The hot water dispenser 102 is uncoupled from the water tank 6.

The remainder of the machine of FIG. 7 corresponds to that disclosed above in connection with FIGS. 1-6.

The solution according to FIG. 7 allows to dispense hot water having a higher temperature (about 90° C.) and with greater throughputs.

With the principle of the invention remain unchanged, the embodiments and details of production may of course be widely varied with respect to what has been described and illustrated purely by way of non-limiting example, without thereby departing from the scope of the invention as defined in the attached claims.

The invention claimed is:

1. A machine for the preparation of coffee, comprising:
hydraulic pumping means for the controlled supply of a flow of water;
at least one unit for the preparation and dispensing of the coffee, with at least one dispensing seating, said unit comprising an electric heater, located upstream of said seating and suitable for heating up to a predetermined temperature a flow of water passing through the heater;
a hydraulic circuit which connects the pumping means to the inlet of said heater and which comprises solenoid valve means capable of assuming a rest configuration in which said heater is substantially emptied of water and a working configuration in which the heater is enabled to receive and be traversed by a flow of water sent by the pumping means for the preparation of the coffee; and
control means arranged for activating the heater and causing said solenoid valve means to change to the working configuration only when a command is issued for the preparation and dispensing of coffee,
wherein, in said unit, hydraulically upstream of the heater, a chamber is provided which is in a heat exchange relationship with the heater and is capable of pre-heating a flow of water directed towards said heater,
wherein the machine further comprises a unit for generating hot steam, and
wherein said solenoid valve means are capable of assuming a further working configuration in which said heater is disabled from receiving the flow of water sent by the pumping means, and in which said chamber is connected to the inlet of the steam generating unit so that the latter is enabled to receive the flow of water coming from the pumping means and passing through said chamber.

2. A machine according to claim 1, wherein the unit for the preparation and dispensing of coffee comprises a further heating device located hydraulically between said chamber and the steam generating unit and capable of further pre-heating the flow of water directed towards said steam generating unit.

3. A machine according to claim 2, wherein said further heater is provided in said first body.

4. A machine according to claim 2, wherein the heater and the optional further heater comprise a respective heat exchanger defining a substantially helical path for the flow of water passing through.

5. A machine according to claim 1, further comprising a water reservoir and a device for dispensing hot water connected to said reservoir and selectively connectable to an outlet of the unit for generating hot steam, said dispensing device being arranged in such a way that a flow of hot steam fed thereto is capable of triggering and heating a flow of water from said reservoir.

6. A machine according to claim 5, wherein said water reservoir is further connected to the inlet of the pumping means and is provided with level sensing means capable of delivering a signal to the control means when the level of the water in said reservoir falls below a predetermined minimum level.

7. A machine according to claim 1, wherein the pumping means comprise a main electric pump, preferably of the rotary type, and an additional electric pump of reduced power connected substantially in parallel with the main electric pump; the main electric pump and the additional pump being able to be selectively activated by the control means.

8. A machine according to claim 1, wherein the unit for the preparation and dispensing of coffee comprises a first and a second metallic body clamped to each other in a sealed manner and in a thermal exchange relationship at respective coupling surfaces; a first body having a recess which gives onto the coupling surface of the first body and which, together with the coupling surface of the other or second body, defines the aforesaid heating chamber; said heater being provided in said second body.

9. A machine according to claim 1, wherein the hot steam generating unit comprises a plurality of heating modules, clamped to each other in a thermal exchange relationship and fluidly connected in series, at least one of which is provided with electric heating means; each heating module comprising a metallic body in which a substantially helical passage is defined for the flow of fluid passing through.

10. A machine according to claim 1, comprising a hot water dispensing device connectable to said chamber through solenoid valve means and a heating unit coupled in series downstream of said solenoid valve means.

* * * * *